United States Patent
Kim et al.

(10) Patent No.: US 9,911,958 B2
(45) Date of Patent: Mar. 6, 2018

(54) SEPARATOR WITH ENHANCED HEAT RESISTANCE AND ELECTROCHEMICAL DEVICE CONTAINING THE SAME

(71) Applicant: RESEARCH & BUSINESS FOUNDATION SUNGKYUNKWAN UNIVERSITY, Suwon-si (KR)

(72) Inventors: Jin Hwan Kim, Seoul (KR); Young Jun Ko, Suwon-si (KR); Hyuk Yoo, Hanam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 635 days.

(21) Appl. No.: 14/380,532

(22) PCT Filed: Feb. 22, 2013

(86) PCT No.: PCT/KR2013/001453
§ 371 (c)(1),
(2) Date: Aug. 22, 2014

(87) PCT Pub. No.: WO2013/125906
PCT Pub. Date: Aug. 29, 2013

(65) Prior Publication Data
US 2015/0037652 A1    Feb. 5, 2015

(30) Foreign Application Priority Data
Feb. 24, 2012 (KR) .................. 10-2012-0019362

(51) Int. Cl.
*H01M 2/16* (2006.01)
*H01M 2/14* (2006.01)
*H01M 10/052* (2010.01)

(52) U.S. Cl.
CPC ......... *H01M 2/1686* (2013.01); *H01M 2/145* (2013.01); *H01M 2/1646* (2013.01);
(Continued)

(58) Field of Classification Search
CPC .................... H01M 2/1686; H01M 2/1646
See application file for complete search history.

(56) References Cited

U.S. PATENT DOCUMENTS

2009/0098450 A1* 4/2009 Kikuchi ................ B32B 27/32
429/145
2013/0017429 A1* 1/2013 Ha ...................... H01M 2/1653
429/144

FOREIGN PATENT DOCUMENTS

JP        2012-033498 A    2/2012
KR   10-2006-0072065 A    6/2006
(Continued)

OTHER PUBLICATIONS

International Report dated May 9, 2013, in counterpart International Application No. PCT/KR2013/001453 (2 Pages in English, 2 Pages in Korean).

*Primary Examiner* — James Lee
(74) *Attorney, Agent, or Firm* — NSIP Law

(57) ABSTRACT

Disclosed is a separator containing a porous polymer substrate and an inorganic particle layer formed on at least one surface of the porous polymer substrate, and the separator has increased insolubility for an electrolyte and enhanced dimensional stability at high temperatures, therefore, short circuit between a cathode and an anode may be suppressed even when an electrochemical device is overheated, and high temperature cycle characteristics of the electrochemical device are enhanced. In addition, discharge characteristics are improved due to an ion conductance enhancement, since the impregnation of the separator for the electrolyte increases. Therefore, the separator according to the present (Continued)

invention is suited for electrochemical devices that require heat resistance, in particular, for lithium secondary batteries for electric vehicles, since, while the separator according to the present invention has excellent heat resistance, an electrochemical device that includes the separator gives equal performance in electrochemical properties when compared to existing separators.

19 Claims, 2 Drawing Sheets

(52) U.S. Cl.
CPC ........ *H01M 2/1666* (2013.01); *H01M 10/052* (2013.01); *H01M 2220/20* (2013.01); *Y02E 60/122* (2013.01); *Y02P 70/54* (2015.11)

(56) References Cited

FOREIGN PATENT DOCUMENTS

| | | | |
|---|---|---|---|
| KR | 10-2006-0112822 A | 11/2006 | |
| KR | 10-2007-0000231 A | 1/2007 | |
| KR | 10-2008-0097364 A | 11/2008 | |
| KR | 10-2009-0056811 A | 6/2009 | |
| KR | 10-2011-0097864 A | 8/2011 | |
| WO | WO 2011/115376 | * 9/2011 | .............. H01M 2/14 |

* cited by examiner

[Fig. 1]
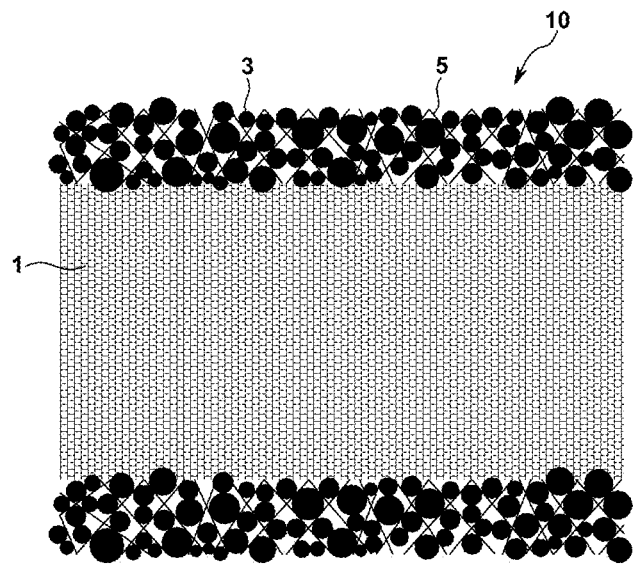
[Fig. 2]
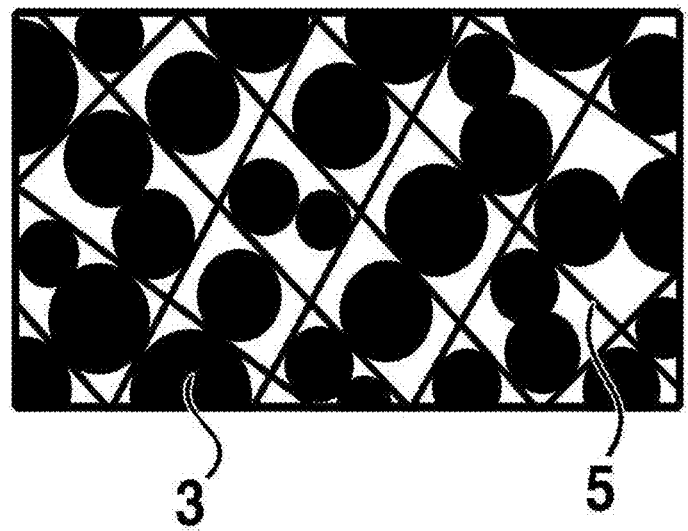

[Fig. 3]
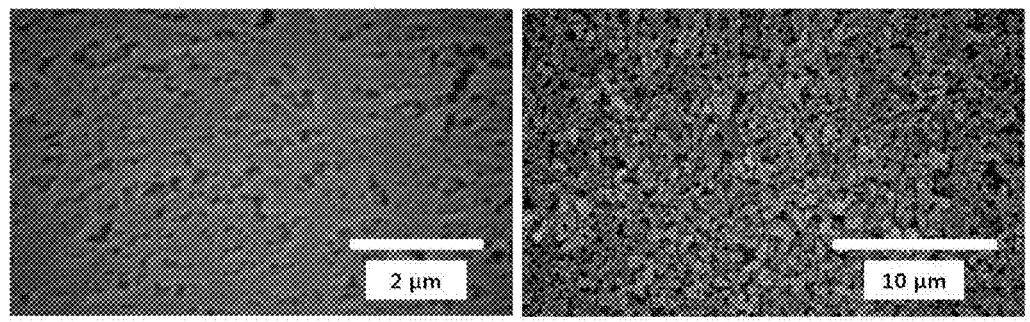
(a)　　　　　　　　　　(b)
[Fig. 4]
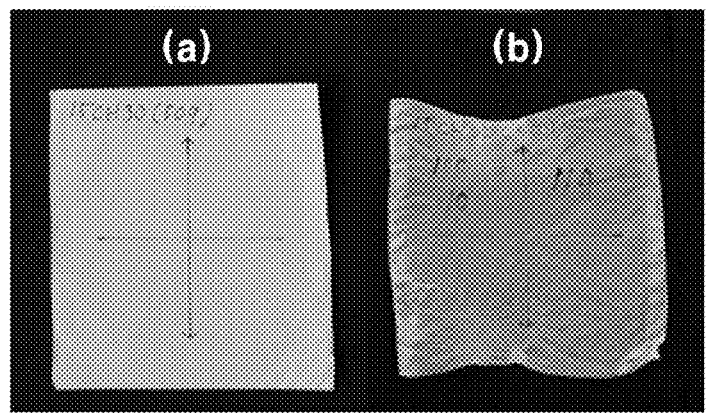
[Fig. 5]
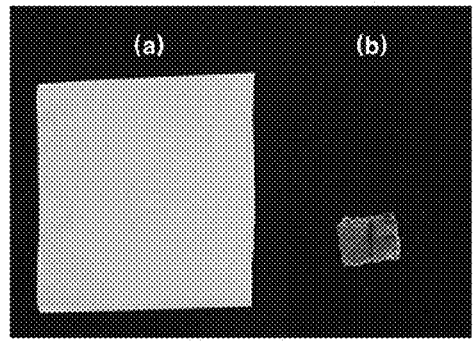

SEPARATOR WITH ENHANCED HEAT RESISTANCE AND ELECTROCHEMICAL DEVICE CONTAINING THE SAME

CROSS-REFERENCE TO RELATED APPLICATIONS

This application is a U.S. national stage application under 35 U.S.C. § 371 of International Application No. PCT/KR2013/001453, filed on Feb. 22, 2013, which claims the benefit of Korean Application No. 10-2012-0019362 filed on Feb. 24, 2012 in the Korean Intellectual Property Office, the entire disclosures of which are incorporated herein by reference for all purposes.

TECHNICAL FIELD

The present invention relates to a separator that can be used in electrochemical devices such as lithium secondary batteries, and an electrochemical device containing the same.

BACKGROUND ART

Interest in energy storage technologies has been growing in recent years. As the fields of application have expanded to the energy of mobile phones, camcorders, and laptops, and further to electric vehicles, efforts for the research and development on electrochemical devices have increasingly materialized. The field of electrochemical devices is receiving the most attention, and among these, the development of chargeable and dischargeable secondary batteries has become the focus of attention.

Among secondary batteries currently used, lithium secondary batteries developed in the early 1990s are highly favored due to the advantages of high operating voltage and high energy density compared to conventional batteries such as Ni-MH. However, lithium secondary batteries have a potential danger of causing an explosion due to the generation of an exothermic reaction depending on the environment of use. Particularly, a polyolefin-based porous substrate that is commonly used as a separator of an electrochemical device has a problem in that it shows a severe thermal shrinking behavior at a temperature of 100° C. or higher due to material characteristics and manufacturing process characteristics that include elongation, thereby causing a short circuit between a cathode and an anode.

In order to solve this safety problem of electrochemical devices, Korean Patent Application Laid-Open Publication Nos. 10-2006-72065, 10-2007-231, 10-2008-97364, and the like have proposed a separator in which an inorganic material coating layer made of a mixture of inorganic particles and a binder polymer is formed on at least one surface of a porous polymer substrate having multiple pores. The inorganic particles in the inorganic material coating layer formed on the porous polymer substrate play a role of a kind of a spacer that maintains the physical form of the coating layer, and prevent a cathode and an anode from being in direct contact with each other even when the porous polymer substrate is damaged.

As described above, the inorganic material coating layer formed on the surface of the porous polymer substrate can contribute to the thermal safety enhancement of an electrochemical device, therefore, the development of separators capable of further enhancing the heat resistance of an electrochemical device by adopting a binder polymer having different chemical structures from those proposed in existing patents has continued. In addition, there have been demands for the development of separators that can improve high temperature cycle performance and discharge characteristics of an electrochemical device.

Accordingly, a method for enhancing the heat resistance of a separator by forming a ceramic/binder porous coating layer in a polyolefin-based separator having weak heat resistance using polyvinylidene fluoride-hexafluoropropylene as a binder has been proposed. However, the binder used therein has a melting point of approximately 150° C. and thereby has a limit in heat resistance.

In addition, Korean Patent Application Laid-Open Publication No. 10-2008-97364 uses a binder having a cross-linking structure, however, a thermal initiator such as AIBN that produces radicals when decomposed by heat is used instead of a common chemical curing agent, therefore, the radicals generated therefrom attack the main chain of the binder polymer and as a result, the main chain of the polymer is cross-linked. Therefore, the enhancement in heat resistance has a limit in a method such as this, and in the results, the change in thermal shrinkage percentage, which is the most clear evidence of heat resistance enhancement, have not been described.

In view of the above, the inventors have developed a separator containing a porous polymer substrate and an inorganic particle layer formed on at least one surface of the porous polymer substrate, wherein a binder connects between the inorganic particles, and between the inorganic particles and the porous polymer substrate, the binder is formed on the porous polymer substrate by curing polyester that includes one or more hydroxyl groups, carboxyl groups or both at the end, in the side chain or both using an isocyanate-based curing agent at a temperature at which the porous polymer substrate does not shrink by 10% or more in length, the porous polymer substrate and the network-structured binder formed by the curing reaction of the polyester and the curing agent are integrated, and the inorganic particles are collected and fixed inside the network-structured binder, and have verified that, when the separator is used in an electrochemical device, a short circuit between a cathode and an anode can be suppressed even when the electrochemical device is overheated, since the thermal shrinkage of the porous polymer substrate that is used as a separator is suppressed when the electrochemical device is overheated, and that effects enhancing the high temperature cycle characteristics of the electrochemical device can be obtained, and have thereby completed the present invention.

DISCLOSURE

Technical Problem

An objective of the present invention is to provide a separator that has excellent heat resistance resulting in safety for an electrochemical device at high temperatures, and a preparation method thereof.

Another objective of the present invention is to provide an electrochemical device that is safe at high temperatures by using the separator.

Technical Solution

The present invention provides a separator containing a porous polymer substrate and an inorganic particle layer formed on at least one surface of the porous polymer substrate, wherein a binder connects between the inorganic particles, and between the inorganic particles and the porous polymer substrate, the binder is formed on the porous polymer substrate by curing polyester that includes one or more hydroxyl groups, carboxyl groups or both at the end, in the side chain or both using an isocyanate-based curing agent at a temperature at which the porous polymer substrate does not shrink by 10% or more in length, the porous polymer substrate and the network-structured binder formed by the curing reaction of the polyester and the curing agent are integrated, and the inorganic particles are collected and fixed inside the network-structured binder.

In addition, the present invention provides a method for preparing a separator that contains a porous polymer substrate and an inorganic particle layer formed on at least one surface of the porous polymer substrate, which includes a first step of applying a solution that contains an isocyanate curing agent, inorganic particles, and polyester that includes one or more hydroxyl groups, carboxyl groups or both at the end, in the side chain or both, to the porous polymer substrate; and a second step of curing the polyester using the isocyanate-based curing agent at a temperature at which the porous polymer substrate does not shrink by 10% or more in length, and connecting between the inorganic particles, and between the inorganic particles and the porous polymer substrate through the cross-linked binder formed therefrom.

Furthermore, the present invention provides an electrochemical device that includes a cathode, an anode, and a separator interposed between the cathode and the anode, wherein a separator according to the present invention or a separator prepared according to the manufacturing method of the present invention is used as the separator.

Hereinafter, the present invention will be described in detail.

The present invention is characterized in that inorganic particles may hinder the shrinkage of a porous polymer substrate even at a temperature higher than or equal to the melting point of the porous polymer substrate through a binder that is a final cured material cured by adjusting the chemical equivalent of a binder polymer reactive group and the equivalent of a curing agent reactive group.

A method for preparing a separator according to the present invention, containing a porous polymer substrate and an inorganic particle layer formed on at least one surface of the porous polymer substrate, is characterized in that a solution that contains an isocyanate-based curing agent, inorganic particles, and polyester including one or more hydroxyl groups, carboxyl groups or both at the end, in the side chain or both, is applied to the porous polymer substrate, and then a curing reaction is carried out at a temperature at which the porous polymer substrate does not shrink by 10% or more in length, and as a result, the porous polymer substrate and the network-structured binder formed by the curing reaction of the polyester and the curing agent are integrated, and the inorganic particles are collected and fixed inside the network-structured binder.

While a separator according to Korean Patent Application Laid-Open Publication No. 10-2008-97364 uses a material as a binder that can cause a curing reaction on its own by using a heat initiator such as AIBN that generates radicals as it is decomposed by heat, a separator according to the present invention forms a structure in which inorganic particles are collected inside the network-structured binder by using a separate curing agent.

The separator according to the present invention has superior thermal stability to the extent that it has almost no thermal shrinkage until the temperature reaches a decomposition temperature of the binder polymer due to the binder having a network structure formed from a curing reaction, and may also efficiently hinder the shrinkage of the polymer porous substrate due to the inorganic particles collected and fixed inside the network structure, so that the thermal shrinkage percentage of the separator is 20% or less in length at a temperature lower than or equal to the melting point of the porous polymer substrate, and 50% or less in length at a temperature higher than or equal to the melting point of the porous polymer substrate. As a result, the separator of the present invention has significantly increased heat resistance.

The term polyester used in the present invention includes copolymerized polyester. Polyester is preferably copolymerized polyester prepared as a diol monomer of one type, a dicarboxylic acid monomer of one type, and a comonomer of one or more types, and thereby includes one or more hydroxyl groups, carboxyl groups or both in the side chain.

In the present invention, the polyester is not limited as long as it is a type of polyester that includes one or more hydroxyl groups, carboxyl groups or both at the end, in the side chain or both, however, copolymerized polyester that is polymerized using a diol monomer of one or more types; a dicarboxylic acid monomer of one or more types; and a comonomer selected from the group consisting of a monomer including two or more hydroxyl groups of one or more types and having a molecular weight of 10,000 g/mol or less, a monomer including two or more carboxyl groups of one or more types and having a molecular weight of 10,000 g/mol or less, and a mixture thereof; is preferable.

Generally, polyester formed by polymerizing a diol monomer of one type and a dicarboxylic acid monomer of one type may have the basic structure of the following Formula 1.

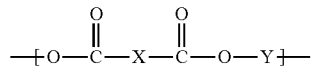

[Formula 1]

In the formula, X and Y are each independently an aliphatic, aromatic or alicyclic radical unsubstituted or substituted with one or more hydroxyl groups or carboxyl groups.

Herein, nonlimiting examples of the aliphatic may include aliphatic hydrocarbon having 1 to 20 carbon atoms, and the like, and nonlimiting examples of the aromatic may include aromatic hydrocarbon having 20 or less carbon atoms, for example, naphthyl (particularly 2-naphthyl) and phenyl, which are unsubstituted or substituted with a substituent selected from among lower alkyl (particularly methyl) unsubstituted or substituted with cyano, hydroxyl-, amino- or 4-methyl-piperazinyl, trifluoromethyl, isolated or esterified hydroxyl group, isolated, alkylated or acylated amino, and isolated or esterified carboxyl group, and the like, and nonlimiting examples of the alicyclic may include mono- or poly-cyclic compounds having 30 or less carbon atoms, 20 or less carbon atoms, or 10 or less carbon atoms.

In addition, nonlimiting examples of the polyester that can be used in the present invention include polyglycolic acid (PGA), polylactic acid (PLA), polycaprolactone (PCL), polyethylene adipate (PEA), polyhydroxylalkanoate (PHA), polyhydroxylbutyrate (PHB), poly(3-hydroxylbutyrate-co-3-hydroxylvalerate) (PHBV), polyethylene terephthalate (PET), polybutylene terephthalate (PBT), polytrimethylene terephthalate (PTT), polyethylene naphthalate (PEN), Vectran, and the like.

Nonlimiting examples of the monomer including two or more hydroxyl groups and having a molecular weight of 10,000 g/mol or less include ethylene glycol, neopentyl glycol, 1,3-cyclohexanedimethanol, 1,4-cyclohexanedimethanol, 1,4-cyclohexanetrimethanol, or a mixture thereof.

In addition, nonlimiting examples of the monomer including two or more carboxyl groups and having a molecular weight of 10,000 g/mol or less include acrylic acid, methacrylic acid, terephthalic acid, monobutyl itaconic acid, or a mixture thereof.

The physical properties of the polyester, and the amount of the hydroxyl group and/or the amount of the carboxyl group participating in the curing reaction vary depending on the types and the contents of the monomer.

Polyester is a thermoplastic polymer in itself. Therefore, when a polyester resin is used alone, it is deformed and melted at high temperatures and dissolved in an organic solvent. As a result, when a heat curing polymer is made by a reaction using a curing agent, it is effective in that the polymer is not melted at high temperatures, and the solubility of the polymer for solvents greatly decreases.

Meanwhile, when a porous polymer substrate is polyethylene, the melting point of the porous polymer substrate is 140° C. When a polyethylene-based polymer is used as the porous polymer substrate in the present invention, the shrinkage of a separator occurs due to the heat generated at a temperature of 100° C. or higher. Therefore, the curing reaction needs to be progressed quickly at a temperature of 100° C. or lower.

In the present invention, by carrying out the curing reaction of polyester after the solution containing isocyanate and inorganic particles is applied to the porous polymer substrate using an isocyanate curing agent that is a curing agent capable of curing polyester at a temperature of less than 100° C., the inorganic particle layer formed on at least one surface of the porous polymer substrate may reduce the shrinkage of the porous polymer substrate, and specifically, reduce the thermal shrinkage percentage of the separator to be 20% or less in length at a temperature lower than or equal to the melting point of the porous polymer substrate, and 50% or less in length at a temperature higher than or equal to the melting point of the porous polymer substrate.

Nonlimiting examples of the isocyanate curing agent include tolylene diisocyanate, xylene diisocyanate, diphenylmethane diisocyanate, hexamethylene diisocyanate, isoform diisocyanate, tetramethylxylene diisocyanate and naphthalene diisocyanate. In addition, as the isocyanate curing agent, all high molecules or low molecules including an isocyanate group may be used.

The reaction mechanism of the polyester and the isocyanate-based curing agent is R—NCO+polyester-OH→R—NHCO—O-polyester. Alternatively, the reaction mechanism is R—NCO+polyester-COOH→R—NHCO—O—CO-polyester. In other words, the isocyanate group reacts with a hydroxyl group and/or a carboxyl group present in the polyester.

The amount of the curing agent used in the formation of the binder is preferably adjusted in order that the inorganic particles hinder the shrinkage of the polymer porous substrate through the network structure of the binder so that the thermal shrinkage percentage of the separator is 20% or less in length at a temperature lower than or equal to the melting point of the porous polymer substrate, and 50% or less in length at a temperature higher than or equal to the melting point of the porous polymer substrate.

Therefore, the amount of the curing agent used in the present invention is preferably adjusted so that the hydroxyl group and/or the carboxyl group of the polyester:the isocyanate group of the isocyanate curing agent is 1:2 to 1:5 equivalents. It was verified that, in Comparative Example 2, the shrinkage percentage did not significantly decrease when the curing agent was added in 1 equivalent, however, in Example 1, when the curing agent was added in 4 equivalents, the shrinkage percentage decreased. When the curing agent is added in less than 2 equivalents, the physical properties of the cured material are deteriorated, portions that are dissolved in an electrolyte may appear since the curing reaction is not complete, and it may not contribute to the improvement in anti-shrinkage at high temperature since the adhesive strength with the porous substrate is reduced. On the other hand, when the curing agent is added in more than 5 equivalents, the brittleness of the coated separator increases and the separator may not be suitable for electrochemical device manufacturing processes.

The porous polymer substrate used in the present invention may be prepared as a polyolefin-based polymer. Nonlimiting examples of the porous polymer substrate may include a membrane formed using each polyolefin-based polymer such as polyethylene including high-density polyethylene, linear low-density polyethylene, low-density polyethylene and ultrahigh-molecular-weight polyethylene, polypropylene, polybutylene and polypentene alone or with a polymer mixed with these polyolefin-based polymers.

In addition, the porous polymer substrate used in the present invention may be a non-woven fabric, and nonlimiting examples thereof include a polyolefin-based non-woven fabric described above, and a non-woven fabric formed using each polyethylene terephthalate, polybutylene terephthalate, polyester, polyacetal, polyamide, polycarbonate, polyimide, polyetheretherketone, polyethersulfone, polyphenylene oxide, polyphenylenesulfidro, polyethylene naphthalene alone or with a polymer mixed with these. The structure of the non-woven fabric is preferably a spun-bonded non-woven fabric made of long fibers or a melt-blown non-woven fabric.

The thickness of the porous polymer substrate is not particularly limited, but preferably ranges from 5 μm to 50 μm, and although the size of the pores present in the porous substrate and the porosity is not particularly limited as well, the range is preferably 0.01 μm to 50 μm, and 10% to 95%, respectively.

The inorganic particles used in the formation of the porous inorganic material coating layer are not particularly limited as long as the particles are electrochemically stable. In other words, the inorganic particles that can be used in the present invention are not particularly limited as long as an oxidation and/or reduction reaction does not occur in the operating voltage range (for example, 0 to 5 V based on $Li/Li^+$) of the electrochemical device in which the particles are used. Particularly, when inorganic particles having an ion transfer ability are used, performance improvement can be promoted by increasing an ion conductance in the electrochemical device.

In addition, when inorganic particles having a high dielectric constant are used as the inorganic particles, the ion conductance of the electrolyte can be enhanced by the particles contributing to the degree of dissociation increase of the electrolyte salt in the liquid electrolyte, for example, a lithium salt.

Due to the reasons described above, the inorganic particles preferably include high dielectric constant inorganic particles having a dielectric constant of 5 or higher, preferably 10 or higher, inorganic particles having a lithium ion transfer ability, or a mixture thereof. Nonlimiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN—PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or a mixture thereof.

Particularly, the inorganic particles such as $BaTiO_3$, $Pb(Zr,Ti)O_3$ (PZT), Pb1-xLaxZr1-yTiyO_3 (PLZT), $PB(Mg_3Nb_{2/3})O_3$—$PbTiO_3$ (PMN—PT) and hafnia ($HfO_2$) described above show high dielectric constant characteristics with a dielectric constant of 100° C. or higher, and can also promote the safety improvement of an electrochemical device by having piezoelectricity in which a potential difference occurs between both surfaces by generating charges when tensioned and compressed by applying a constant pressure, and thereby preventing the occurrence of short circuit inside both electrodes from outside stimulation. In addition, when the high dielectric constant inorganic particles described above and the inorganic particles having a lithium ion transfer ability are combined, the synergy effect thereof can be redoubled.

In the present invention, the inorganic particles having a lithium ion transfer ability refer to inorganic particles that contain a lithium element, but do not store lithium, and have a function to transfer lithium ions, and the lithium ion conductance in a battery is enhanced since the inorganic particles having a lithium ion transfer ability may transfer and move the lithium ions due to a kind of defect present inside the particle structure, and as a result, the performance improvement of a battery can be achieved. Nonlimiting examples of the inorganic particles having a lithium ion transfer ability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ series glass ($0<x<4$, $0<y<13$) such as and $14Li_2O$-$9Al_2O_3$-$38TiO_2$-$39P_2O_5$, lithium germanium thiophosphate ($Li_xGe_yP_zS_w$, $0<x<4$, $0<y<1$, $0<z<1$, $0<w<5$) such as lithium lanthanum titanate ($Li_xLa_yTiO_3$, $0<x<2$, $0<y<3$), and $Li_{3.25}Ge_{0.25}P_{0.75}S_4$, lithium nitride ($Li_xN_y$, $0<x<4$, $0<y<2$) such as $Li_3N$, $SiS_2$ series glass ($LixSiySz$, $0<x<3$, $0<y<2$, $0<z<4$) such as $Li_3PO_4$—$Li_2S$—$SiS_2$, $P_2S_5$ series glass ($Li_xP_yS_z$, $0<x<3$, $0<y<3$, $0<z<7$) such as $LiI$—$Li_2S$—$P_2S_5$, a mixture thereof, or the like.

The size of the inorganic particles is not limited, but preferably has a range of 0.01 μm to 10 μm, if possible, for the formation of a coating layer with a uniform thickness, and proper porosity. If the size is less than 0.01 μm, the dispersibility is reduced and controlling the physical properties of the separator is not simple, and when the size is greater than 10 μm, the thickness of the porous inorganic material coating layer increases causing the deterioration of mechanical physical properties, and in addition to this, the probability of inside short circuit occurrence increases when charging and discharging a battery due to the excessively big pore sizes.

In the present invention, the composition ratio of the inorganic particles and the binder preferably has a range of, for example, 50:50 to 99:1 (weight ratio), and more preferably 60:40 to 95:5. The thickness of the porous inorganic material coating layer made of the inorganic particles and the binder is not particularly limited, but preferably has a range of 0.01 μm to 20 μm. In addition, the pore sizes and the porosity are not particularly limited as well, however, the pore sizes preferably have a range of 0.01 μm to 10 μm, and the porosity preferably has a range of 5% to 90%.

According to the present invention, the method for preparing a separator that contains a porous polymer substrate and an inorganic particle layer formed on at least one surface of the porous polymer substrate, includes a first step of applying a solution that contains an isocyanate curing agent, inorganic particles, and polyester that includes one or more hydroxyl groups, carboxyl groups or both at the end, in the side chain or both, to the porous polymer substrate; and a second step of curing the polyester using the isocyanate-based curing agent at a temperature at which the porous polymer substrate does not shrink by 10% or more in length, and connecting between the inorganic particles, and between the inorganic particles and the porous polymer substrate through the cross-linked binder formed therefrom.

In the first step, it is preferable that the polyester, the isocyanate curing agent and the inorganic particles be uniformly mixed.

The organic solvent that can be used in the preparation of the solution used in the first step is not limited in the types and the combinations as long as it can be miscible with polyester, however, one or more selected from the group consisting of acetone, acetonitrile, butylacetate, butyl alcohol, chloroform, dichloromethane, dichloroethane, nitropropane, nitroethane, cresol, ethyl acetate, methylethyl ketone, ethyleneglycol diacetate, ethyleneglycol diethylether, ethyleneglycol dimethylether, ethyleneglycol monobutylether, ethyleneglycol monoethylether, hexane, heptane, isopropyl alcohol, methylisobutyl ketone, diisobutyl ketone, tetrahydrofuran, methylamyl ketone, cellosolve acetate, methyl cellosolve, benzene, toluene, xylene, cyclohexanone, isophorone, chlorobenzene, dioxane, aromatic solvent naphtha and dibasic ethers may be preferably used.

Meanwhile, it is preferable that a catalyst capable of promoting a reaction be used when curing. Using dibutyltin dilaurate (DBTL, $(CH_3CH_2CH_2CH_2)_2Sn[CH_3(CH_2)_{10}COO]_2$) as the catalyst capable of promoting the reaction of the isocyanate group, and the hydroxyl group and/or the carboxyl group is preferable, however, the catalyst is not limited thereto. Nonlimiting examples thereof include triethylenediamine (TEDA), 1,4-diazabicyclo[2.2.2]octane, bis(2-dimethylaminoethyl)ether, trimethylaminoethylethanolamine, 2-methyl-2-azanorbornane, N,N-dimethylcyclohexylamine, N-ethylmorpholine and dimethylaminopropylamine as a tertiary amine, and a quarternary ammonium and a carboxylate salt of an alkali metal may be used. In addition, as organometallic compounds, dibutyltin, stannous octoate ($Sn[C_7H_{15}COO]_2$), dibutyltin diacetate ($(CH_3CH_2CH_2CH_2)_2Sn[CH_3CO]_2$) dibutyltin dimercaptide ($(CH_3CH_2CH_2CH_2)_2Sn[SC_{12}H_{25}]$) may be used among dialkyltin dicarboxylates.

Regarding the content of the catalyst, the catalyst is preferably added in 0.01 to 2.0 parts by weight with respect to the mixture of the polyester and the curing agent (100 parts by weight). More preferably, the content may be 0.1 to 1.0 parts by weight.

Meanwhile, the curing reaction in the second step is preferably carried out for 1 second to 300 seconds at 60° C. to 100° C., and more preferably carried out for 30 seconds to 90 seconds at 80° C. to 90° C.

It is preferable that an aging step be additionally included after the second step. The aging step is for postcuring. The temperature and the time in the aging step is preferably 1 hour to 7 days at 30° C. to 90° C., respectively, and more preferably, 3 days to 4 days at 30° C. to 50° C., respectively. If the aging step is not included, the physical properties of the cured binder are deteriorated and the cured binder may not function properly as a binder.

In addition, the present invention provides an electrochemical device that includes a cathode, an anode, and a separator interposed between the cathode and the anode, wherein the separator is a separator of the present invention.

The electrochemical device includes all devices that react electrochemically, and specific examples thereof include all types of primary and secondary batteries, fuel cells, solar cells or capacitors such as super capacitor devices, and the like. Particularly, among the secondary batteries, lithium secondary batteries including a lithium metal secondary battery, a lithium ion secondary battery, a lithium polymer secondary battery or a lithium ion polymer secondary battery are preferable. The electrochemical device is particularly preferably a lithium secondary battery for electric vehicles.

The electrochemical device may be manufactured using common methods known in the related arts, and as one example thereof, the electrochemical device may be manufactured by interposing the separator described above between the cathode and the anode, assembling them, and then injecting the electrolyte thereto. When the separator of the present invention is used, common polyolefin-based porous membranes may be used together as necessary.

The electrode to be used together with the separator of the present invention is not particularly limited, and the electrode may be manufactured in the form of binding an electrode active material to an electrode current collector according to common methods known in the related arts. As nonlimiting examples of the cathode active material among the electrode active materials, common cathode active materials that can be used in the cathode of existing electrochemical devices may be used, and particularly, lithium manganese oxides, lithium cobalt oxides, lithium nickel oxides, lithium iron oxides or lithium composite oxides combining these are preferably used. As nonlimiting examples of the anode active material among the electrode active materials, common anode active materials that can be used in the anode of existing electrochemical devices may be used, and particularly, lithium metals or lithium alloys, lithium adsorbates such as carbon, petroleum coke, activated carbon, graphite or other carbons, and the like, are preferable. Nonlimiting examples of the cathode current collector includes foil prepared from aluminum, nickel or a combination thereof, and the like, and nonlimiting examples of the anode current collector includes foil prepared from copper, gold, nickel, copper alloys or a combination thereof, and the like.

The electrolyte that can be used in the present invention is a salt having a structure such as $A^+B^-$, and $A^+$ includes ions formed with an alkali metal cation such as $Li^+$, $Na^+$, $K^+$ or a combination thereof, and $B^-$ includes those in which a salt including an ion formed with an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof is dissolved or dissociated in an organic solvent formed with propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrolidine (NMP), ethylmethyl carbonate (EMC), gamma butyrolactone (-butyrolactone) or a mixture thereof, however, $A^+$ and $B^-$ are not limited thereto.

The injection of the electrolyte may be carried out in a proper stage in a battery manufacturing process depending on the manufacturing process and the required physical properties for the final products. In other words, the injection may be carried out in a stage prior to battery assembly or in the final stage of battery assembly.

As the process to apply the separator of the present invention to a battery, a lamination (stack) and a folding process of the separator and the electrode may be used in addition to a winding process that is a general process. Particularly, when the separator of the present invention is used in the lamination (stack) process among the processes described above, the effect of thermal safety enhancement of an electrochemical device becomes significant. This is caused by the fact that the batteries manufactured using a lamination and a folding processes experience more severe thermal shrinkage of the separation membrane compare to the batteries manufactured using a general winding process. In addition, when the separator of the present invention is used in the lamination (stack) process, assembly at high temperatures is easier due to the excellent thermal stability and adhesive strength characteristics exhibited by the binder according to the present invention.

Advantageous Effects

A separator according to the present invention has increased insolubility for an electrolyte and enhanced dimensional stability at high temperatures, therefore, it is effective in that short circuits between a cathode and an anode may be suppressed even when an electrochemical device is overheated, and high temperature cycle characteristics of the electrochemical device are enhanced. In addition, discharge characteristics are improved due to an ion conductance enhancement, since the impregnation of the separator for the electrolyte increases. Therefore, the separator according to the present invention is suited for electrochemical devices that require heat resistance, in particular, for lithium secondary batteries for electric vehicles, since, while the separator according to the present invention has excellent heat resistance, an electrochemical device that includes the separator gives equal performance in electrochemical properties when compared to existing separators.

DESCRIPTION OF DRAWINGS

FIG. 1 is a cross-sectional diagram that schematically shows a separator according to the present invention by a diagram (1: porous membrane, 3: inorganic particles, 5: binder, 10: separator).

FIG. 2 schematically shows an image in which inorganic particles are collected and fixed inside a network-structured binder formed using a curing reaction according to the present invention.

FIG. 3 is an SEM picture of an organic/inorganic composite porous separator prepared in Example 1, and (a) represents a porous polymer substrate before coating and (b) represents a porous inorganic material coating layer after coating.

FIG. 4 shows an image of a porous separator prepared in Example 1 before thermal shrinkage (a) and after thermal shrinkage (b) at 170° C.

FIG. 5 shows an image of a porous separator prepared in Comparative Example 1 before thermal shrinkage (a) and after thermal shrinkage (b) at 170° C.

MODE FOR DISCLOSURE

Hereinafter, preferable examples are provided in order to help understanding the present invention. However, the following examples are provided only to facilitate the understanding of the present invention, and the present invention is not limited to these examples.

EXAMPLE 1

1-1. Preparation of Separator

A copolymerized polyester was prepared using common methods disclosed in Korean Patent Application Laid-Open Publication No. 10-2007-0119229 using terephthalic acid, dimethyl 1,4-cyclohexanedicarboxylate, trimellitic acid anhydrate, ethylene glycol, an 2,2-bis(4-hydroxyphenyl) propane propylene oxide adduct, 1,4-cyclohexanedimethanol, glycerol and hydrogenated polybutadiene polyol (number average molecular weight was approximately 1,300 g/mol, hydroxyl group was 75 KOH mg/g). The prepared copolymerized polyester had properties that the molecular weight was 18,000 g/mol, the glass transition temperature was 71° C., and the -OH value was 5 to 11 KOH mg/g. After 2.0% by weight of the copolymerized polyester was completely dissolved in a solvent in which tetrahydrofuran and cyclohexanone are mixed in a weight ratio of 5:5, 14% by weight of alumina particles having an average particle size of approximately 0.4 μm is introduced and dispersed thereto. 0.2% by weight of an isocyanate curing agent (N-3300, manufactured by Bayer) of Formula 2 in a HDI trimer form and 0.02% by weight of a dibutyltin dilaurate (DBTL) reaction accelerator were introduced in consecutive order and dissolved (the solid was 16% by weight, the curing agent equivalent ratio was 4). After that, this mixed solution was coated on a polyethylene porous substrate having a thickness of 9 μm using a dip coating method, the result was dried at room temperature, cured for approximately 1 minute in a dry oven at 90° C., and then aged for 3 days in a dry oven at 40° C., and as a result, a separator was prepared.

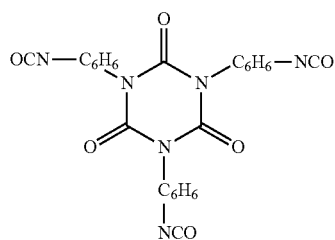

[Formula 2]

1-2. Battery Assembly

Cathode mixture slurry was prepared by adding 94% by weight of $LiCoO_2$ as an cathode active material, 3% by weight of carbon black as a conductive agent, and 3% by weight of PVdF as a binding agent to N-methyl-2-pyrolidone (NMP) that is a solvent. An cathode was prepared by applying the cathode mixture slurry on an aluminum (Al) thin film that is an cathode collector having a thickness of approximately 20 μm, and drying the result.

Anode mixture slurry was prepared by adding carbon powder as a anode active material, PVdF as a binding agent, and carbon black as a conductive agent in 96% by weight, 3% by weight, and 1% by weight, respectively, to NMP that is a solvent. A anode was prepared by applying the anode mixture slurry on an copper (Cu) thin film that is a anode collector having a thickness of approximately 10 μm, and drying the result.

The anode, the cathode and the separator prepared in Example 1-1 were assembled inside a coin cell made of aluminum and stainless in a stacking manner, and a prefabricated lithium ion secondary battery was prepared using an ethylenecarbonate/ethylenemethylene carbonate (EC/EMC=30:70% by volume)-based electrolyte in which 1 M of lithiumhexafluoro phosphate ($LiPF_6$) was dissolved.

COMPARATIVE EXAMPLE 1

A lithium secondary battery was prepared in the same manner as in Example 1 except that the polyethylene porous substrate having a thickness of 9 μm used in Example 1-1 was used as a separator.

COMPARATIVE EXAMPLE 2

A separator (the solid was 16% by weight, the curing agent equivalent ratio was 1) and a lithium secondary battery were prepared in the same manner as in Example 1 except that the copolymerized polyester, the alumina particles, the isocyanate curing agent, and the DBTL, which were prepared in Example 1-1, were used in 2% by weight, 14% by weight, 0.05% by weight, and 0.013% by weight, respectively.

COMPARATIVE EXAMPLE 3

A separator and a lithium secondary battery were prepared in the same manner as in Example 1 except that 0.2% by weight of a hexamethoxymethyl melamine-type melamine curing agent (Melcross03, manufactured by P&ID, Co., Ltd.) was used instead of the isocyanate curing agent, and 0.02% by weight of para-toluenesulfonic acid was used instead of the DBTL as the reaction accelerator.

COMPARATIVE EXAMPLE 4

A separator was prepared in the same manner as in Comparative Example 3 except that the curing reaction was carried out in a dry oven at 120° C., however, the evaluation was not carried out since the separator shrank for 10% or more during the curing reaction.

EXPERIMENTAL EXAMPLE 1

Evaluation on Separator and Lithium Secondary Battery Characteristics

The thickness, the permeability and the thermal shrinkage percentage of the separators prepared according to Example 1, and Comparative Examples 1 to 3, and the discharge capacity of the lithium secondary batteries prepared according to Example 1, and Comparative Examples 1 to 3 were evaluated using the following experimental methods.

EXPERIMENTAL EXAMPLE 1-1

Measurement on Separator Thickness

The thickness of the separator was measured using a micrometer, and the experimental results are shown in the following Table 1.

EXPERIMENTAL EXAMPLE 1-2

Thermal shrinkage Analysis of Separator

After the separators prepared according to Example 1, and Comparative Examples 1 to 3 were cut into a square shape having a size of 6 cm×6 cm each, lines of 4 cm were drawn in the MD direction and the TD director with center as the base, then each of the squares were left unattended for 10 minutes at each temperature (130° C., 140° C., 170° C.) shown in Table 1, and then the squares were collected. The thermal shrinkage percentage was measured by the length decrease of the lines drawn. The experimental results are shown in the following Table 1, and the results at 170° C. are shown in FIG. 3 and FIG. 4.

EXPERIMENTAL EXAMPLE 1-3

Performance Evaluation of Lithium Secondary Battery

In order to compare the discharge characteristics of the lithium secondary batteries prepared according to Example 1, and Comparative Example 1 to 3, each battery with a battery capacity of 5.6 mAh was charged to 4.2 V at a charging rate of 0.2 C, and then discharged to 3.0 V at a discharging rate of 0.5 C. The cycle was repeated 20 times, and the resulting discharge capacity of the battery was shown as the ratio with respect to the discharge capacity of the first cycle. The experimental results are shown in the following Table 1.

EXPERIMENTAL EXAMPLE 1-4

Hot Box Experiment

The lithium secondary batteries prepared in Example 1, and Comparative Examples 1 to 3 were stored for 1 hour at 170° C., and the status of the batteries thereafter was described in the following Table 1.

TABLE 1

|  | Example 1 | Comparative Example 1 | Comparative Example 2 | Comparative Example 3 |
|---|---|---|---|---|
| Thickness (μm) | 13 | 9 | 13 | 13 |
| 130° C. Thermal Shrinkage Percentage (%) | 2.5 | 25.0 | 8.5 | 12.5 |
| 140° C. Thermal Shrinkage Percentage (%) | 5.0 | 72.5 | 57.5 | 62.5 |
| 170° C. Thermal Shrinkage Percentage (%) | 5.0 | 80.0 | 57.5 | 68.0 |
| Discharge Capacity (%) | 95.2 | 97.2 | 94.8 | 95.3 |
| Hot box | 0 | Ignited/ Exploded | Ignited/ Exploded | Ignited/ Exploded |

As seen from Table 1, while the polyethylene separator (Comparative Example 1) experienced rapid shrinkage at around 140° C. that was the melting point of polyethylene, and shrank and melted at 170° C. due to the high temperature (FIG. 5), the separator of Example 1 showed enhanced thermal shrinkage percentage at 170° C. thereby exhibited a favorable status (FIG. 4). In Comparative Example 3 that uses a melamine curing agent, the curing reaction was not progressed due to the low curing temperature, and it was seen that the separator severely shrank judging from the thermal shrinkage percentage results.

The invention claimed is:

1. A separator comprising:
a porous polymer substrate; and
an inorganic particle layer formed on at least one surface of the porous polymer substrate,
wherein the inorganic particle layer comprises inorganic particles and a binder structured in a cured network that forms a connection between the inorganic particles, and between the inorganic particles and the porous polymer substrate;
the cured network is formed on the at least one surface of the porous polymer substrate by curing polyester that includes one or more hydroxyl groups, one or more carboxyl groups or combinations thereof at an end of the polyester, in a side chain of the polyester or both using an isocyanate-based curing agent having one or more isocyanate groups at a temperature at which the porous polymer substrate does not shrink by 10% or more in length;
the porous polymer substrate and the cured network formed by reaction of the polyester and the curing agent are integrated; and
the inorganic particles are collected and fixed in the cured network.

2. The separator of claim 1, wherein an amount of the curing agent used in the formation of the binder is adjusted in order that the inorganic particles hinder the shrinkage of the polymer porous substrate through the cured network so that the thermal shrinkage percentage of the separator in length is 20% or less at a temperature lower than or equal to the melting point of the porous polymer substrate, and 50% or less at a temperature higher than the melting point of the porous polymer substrate.

3. The separator of claim 1, wherein the polyester is copolymerized polyester polymerized using a diol monomer of one or more types; a dicarboxylic acid monomer of one or more types; and a comonomer selected from the group consisting of a monomer including two or more hydroxyl groups of one or more types and having a molecular weight of 10,000 g/mol or less, a monomer including two or more carboxyl groups of one or more types and having a molecular weight of 10,000 g/mol or less, and a mixture thereof.

4. The separator of claim 1, wherein an amount of the curing agent used is adjusted so that the total amount of the one or more hydroxyl groups, one or more carboxyl groups or combinations thereof of the polyester:the total amount of the isocyanate groups of the isocyanate curing agent is 1:2 to 1:5 equivalents.

5. The separator of claim 1, wherein the porous polymer substrate is a polyolefin-based porous membrane, or a nonwoven fabric comprised of any one polymer selected from the group consisting of polyethylene terephthalate, polybutylene terephthalate, polyester, polyacetal, polyamide, polycarbonate, polyimide, polyetheretherketone, polyethersulfone, polyphenylene oxide, polyphenylenesulfidro and polyethylene naphthalene, or a mixture of two or more types of these.

6. The separator of claim 1, wherein the inorganic particles include high dielectric inorganic particles having a dielectric constant of 5 or higher, inorganic particles having a lithium ion transfer ability, or a mixture thereof.

7. The separator of claim 1, wherein a size of the inorganic particles is 0.01 μm to 10 μm.

8. The separator of claim 1, wherein a composition ratio of the inorganic particles and the binder has a range of 50:50 to 99:1 (weight ratio).

9. An electrochemical device comprising:
a cathode;
an anode;
a separator interposed between the cathode and the anode, wherein the separator is the separator of claim 1.

10. The electrochemical device of claim 9, wherein the electrochemical device is a lithium secondary battery.

11. The electrochemical device of claim 10, wherein the electrochemical device is a lithium secondary battery for electric vehicles.

12. A method for preparing a separator of claim 1 that contains a porous polymer substrate and an inorganic particle layer formed on at least one surface of the porous polymer substrate, the method comprising:
a first step of applying a solution that contains an isocyanate curing agent, inorganic particles, and polyester that includes one or more hydroxyl groups, carboxyl groups or both at the end, in the side chain or both, to the porous polymer substrate; and
a second step of curing the polyester using the isocyanate-based curing agent at a temperature at which the porous polymer substrate does not shrink by 10% or more in length, and connecting between the inorganic particles, and between the inorganic particles and the porous polymer substrate through a network-structured binder formed therefrom,
wherein in the separator, the porous polymer substrate and the network-structured binder formed by the curing reaction of the polyester and the curing agent are integrated, and the inorganic particles are collected and fixed inside the network-structured binder.

13. The method of claim 12, wherein an amount of the curing agent used in the first step is adjusted in order that the inorganic particles hinder the shrinkage of the polymer porous substrate through the network structure of the binder so that the thermal shrinkage percentage of the separator is 20% or less in length at a temperature lower than or equal to the melting point of the porous polymer substrate, and 50% or less in length at a temperature higher than or equal to the melting point of the porous polymer substrate.

14. The method of claim 12, wherein the polyester is copolymerized polyester polymerized using a diol monomer of one or more types; a dicarboxylic acid monomer of one or more types; and a comonomer selected from the group consisting of a monomer including two or more hydroxyl groups of one or more types and having a molecular weight of 10,000 g/mol or less, a monomer including two or more carboxyl groups of one or more types and having a molecular weight of 10,000 g/mol or less, and a mixture thereof.

15. The method of claim 12, wherein the solution is prepared by introducing and dispersing the inorganic particles to the polyester solution, and then dissolving the isocyanate curing agent therein.

16. The method of claim 12, wherein, in the second step, a catalyst is used in the curing reaction.

17. The method of claim 12, wherein the curing reaction in the second step is carried out for 1 second to 300 seconds at 60° C. to 100° C.

18. The method of claim 12, further comprising:
an aging step after the curing reaction in the second step.

19. The method of claim 12, wherein an amount of the curing agent used is adjusted so that the hydroxyl group and/or the carboxyl group of the polyester: the isocyanate group of the isocyanate curing agent is 1:2 to 1:5 equivalents.

* * * * *